United States Patent [19]
Oshida et al.

[11] 3,770,329
[45] Nov. 6, 1973

[54] BRAKE CONTROL APPARATUS

[75] Inventors: Yasunosuke Oshida; Seisho Okamoto; Ei Ichi Shinomiya, all of Kobe, Japan

[73] Assignee: The Nippon Air Brake Co., Ltd., Kobe, Japan

[22] Filed: Sept. 18, 1972

[21] Appl. No.: 290,216

[52] U.S. Cl. .............................. 303/22 R, 188/195
[51] Int. Cl. ................................................ B60t 8/18
[58] Field of Search ..................... 303/22 R, 22 A; 188/195; 180/DIG. 1, 100

[56] References Cited
UNITED STATES PATENTS

| | | | |
|---|---|---|---|
| 3,442,557 | 5/1969 | Oberthur | 303/22 R |
| 3,512,845 | 5/1970 | Farmery et al. | 303/22 A |

*Primary Examiner*—Duane A. Reger
*Assistant Examiner*—D. C. Butler
*Attorney*—Ralph W. McIntire, Jr.

[57] ABSTRACT

Brake control apparatus utilizing vehicle weight or gravitational force as the primary force for applying the vehicle brakes. The gravitational force is transmitted by a fulcrum lever acting through a fluid medium, the moment arms or fulcrum point of said lever, and therefore the force delivered thereby, being variable according to the deflection of the vehicle springs reflecting the vehicle weight and its load, as well as the effect of vertical oscillations of the wheels during movement of the vehicle over a running surface, thereby controlling the degree of brake shoe pressure on the wheels according to the effective friction of the wheels with the running surface.

13 Claims, 1 Drawing Figure

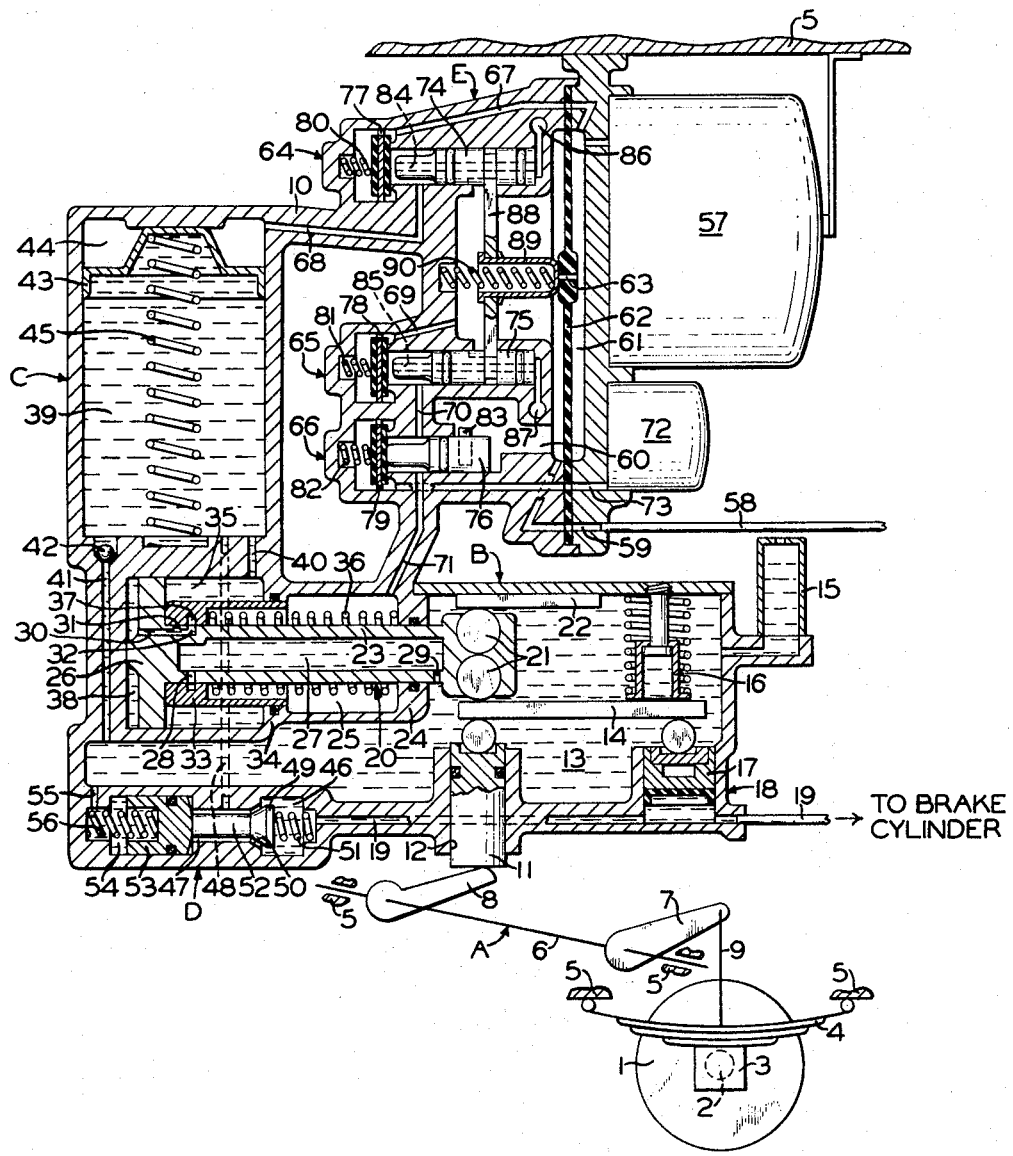

BRAKE CONTROL APPARATUS

BACKGROUND OF THE INVENTION

The coefficient of friction between two bodies differs greatly depending on whether the contact between such bodies is static or moving. The coefficient of static friction is primarily only proportional to the contact pressure, compared to which variations in other elements, for example the pressure contact surface area, etc., are so minor as to be secondary. It is virtually a constant thing. The coefficient of moving friction, however, is smaller than that of static friction and is said to become smaller as the relative velocity increases.

Braking of railway vehicles, that is to say restraining the torsion of the wheel axles, is usually brought about by the force of friction that develops as a result of pressure contact by a brake shoe. In such instances, however, if this friction or adhesion, exceeds that on the running surface between the wheel and the track, the wheels will slide on the track. Not only does this damage the contacting surfaces, but with continued rolling contact of the wheel on that surface, instantaneous static contact changes to a sliding contact state, for which reason the coefficient of friction drops radically, thereby resulting in lengthened braking distance.

Accordingly in ordinary railway vehicles, the coefficient of friction between the wheel and the track that occurs during the aforesaid rolling contact, establishes the upper limits of braking force. The determination of that coefficient is extremely important in the operation of brakes.

Moreover, in the past, the friction between the wheels and the track or the coefficient of adhesion, has been calculated from such measured values as the running speed and the commencement of braking, the braking distance and the braking force, etc. It has been found that such coefficient of adhesion reduces greatly concurrently with increases in the running speed of the cars. It has become the general practice to prevent the wheels from sliding by limiting the vehicle braking force on the basis of this calculated coefficient of adhesion. To state this in another way, despite the fact that it would be possible to reduce braking distance by using a greater braking force, it has become the tendency in practice to reduce braking force to an extent in excess of that normally necessary in order to prevent the wheels from sliding.

Here, the present inventors noted that the aforesaid calculated friction or adhesion, which had come to be thought of as varying with running speed is only apparent and that the true coefficient of friction does not vary that much. To restate this, the pressure contact between the wheel and the track, that is to say, the force which has generally been thought to be proportional to the vehicle weight and thus constant during movement is not actually so. It varies together with the vertical oscillations of the wheels during movement. The inventors further observed that this state of vertical oscillation becomes violent with increases in running speed. Even were the braking force, that is to say the contact pressure between the brake shoe and the wheel constant, while the contact pressure between the wheel and the track varied, it would be impossible to maintain rolling contact between the wheel and the running surface, making it possible for the wheel to slide. THey thus noted that it is impossible, in such a case, to avoid changes in the friction state at the contact surface.

Thus, during rolling contact the coefficient of friction is that of static friction or something approximating it. However, even if momentarily, slipping begins, the coefficient of friction changes to that of moving friction and therefore drops. Thus, at high speed operations, there is a constant alternation between rolling and sliding at the point of contact between the wheels and the track. It must be concluded, therefore, that, as stated before, the coefficient of friction during running of the wheel decreases with increases in rolling speed thereof.

As the gravity deriving from the weight of the car is used as the brake power source in the present invention, there is no need for a special power source for the brakes. Specifically, in the past, operators have controlled braking by varying the conversion rate between gravity and braking power. It goes without saying, however, that a power source is necessary to drive the controls. In the present invention, compressed air or pneumatic pressure is used only for operating the controls. The quantity required is dramatically less than has been needed in the past and this is an additional benefit of the present invention.

SUMMARY OF THE INVENTION

Specifically, the object of the present invention is to maintain rolling contact of the wheels with the running surface and prevent sliding by varying the braking force, that is, the contact pressure of the brake shoe on the wheel, in accordance with the vertical oscillations of the wheel during running thereof, as above explained, so as to permit the use of the overall maximum braking force, it being understood that the truck moves upwardly relative to the wheels when the contact pressure between the track and the wheel is great and, conversely, moves downwardly when such contact pressure is reduced. Therefore, it is also the object of the invention to provide means disposed between the wheel truck and the car body, so as to be operatively affected by the deflection of the load springs reflecting the gravitational force of the car body acting on said springs at all times and to thereby impose a contact pressure on the brake shoes in a certain ratio of the changes in gravitational force to the changes in the upward and downward movement or vertical oscillations of the wheels and thereby make it possible to lower the limits of braking force to a degree less than that provided heretofore by other known anti-wheel-slide devices, thus providing improved braking effects and reduced braking distance.

The invention herein disclosed utilizes the gravitational force provided by the weight of the vehicle for exerting a braking force on the brake shoes by acting through a hydraulic or incompressible medium. The gravitational force is applied to one end of an operating lever and is transmitted to the hyraulic medium by the other end of said lever acting on the piston of a master brake cylinder, said lever having a movable fulcrum so as to transmit said gravitational force to the master cylinder at a ratio determined by the position of a fulcrum member relative to the moment arms of the lever.

A conventional brake pipe nd auxiliary reservoir arrangement is employed in conjunction with a pneumatic-to-hydraulic pressure converter which operates responsively to pneumatic pressure supplied from the auxiliary reservoir, when a brake pipe pressure reduction is effected to place an isolated portion of the hydraulic medium under pressure at a degree corresponding to the degree of brake pipe pressure reduction. The isolated pressurized hydraulic fluid acts on and operates the fulcrum member to a position determined by the degree of pressure of the hydraulic fluid, thereby establishing the relative lengths of the moment arms of the operating lever and the ratio or degree of gravitational force transmitted to the master brake cylinder. Since the braking force is thus established in accordance with the gravitational force or weight of the vehicle cooperatively with the degree of hydraulic fluid pressure established by brake pipe pressure reduction, any variations of the gravitational force due to vertical oscillations of the wheels on uneven or otherwise affected running surfaces (which determines the coefficient of moving friction) is automatically reflected in the braking force transmitted to the brake shoes so that such braking force is always compatible with the running friction of the wheels.

The single FIGURE drawing is an elevation view, mostly in section and with a certain portion thereof in perspective, of a brake control aparatus embodying the invention.

DESCRIPTION AND OPERATION

As shown in the drawing, the brake control apparatus comprises, generally, a car gravity transmission section A, a gravity braking force ratio converter section B, a pneumatic-to-hydraulic pressure converter section C, a hydraulic pressure check valve section D, and a pneumatic pressure drive section E.

An unsprung portion of the vehicle comprises a wheel 1 mounted on an axle 2 for rotation therewith, said axle being rotatably supported in a journal box 3. A vehicle load spring 4 is supported on the journal box 3 for flexibly supporting a sprung portion of the vehicle comprising the vehicle body a portion of which is represented at 5. The car gravity transmission section A comprising a linkage system is operably disposed between the sprung and unsprung portions of the vehicle and specifically comprises a torque rod 6 which is disposed parallel to wheel axle 2 and is axially rotatably supported on the car body 5. The transmission section A further comprises two torque arms 7 and 8 axially spaced on torque rod 6 in perpendicular relation thereto, said torque arms being fixed at respective ends to said torque rod for rotation therewith. The other end of torque arm 7 is connected to one end of connecting rod 9, the other end of said connecting rod being connected to load spring 4 for transmitting the deflections of said spring to said torque arm and thereby effecting rotation of the torque rod 6 in accordance with the deflections of said spring.

The sections B, C, D, and E are all housed within a casing 10 which is secured to another portion of the car body 5.

The gravity braking force ratio converter section B comprises a transfer piston 11 sealingly and slidably operable within a bore 12 formed in casing 10, one end of said piston extending outside of the casing so as to be in contact with the end of torque arm 7 opposite torque rod 6. The opposite end of piston 11 extends to the inside of casing 10 into a hydraulic fluid chamber 13 for operatively engaging one end of an operating lever 14 disposed in said chamber, said one end of said lever being subjected to a gravitational force acting in an upwardly direction, as viewed in the drawing, and as transmitted thereto through said piston from the torque arm 7 of the transmission section A. Hydraulic chamber 13 acts as a storage reservoir for hydraulic fluid which is open and maintained at atmospheric pressure via a fluid level guage 15.

The end of operating lever 14 opposite transfer piston 11 is retained by a spring-biased pressure device 16 in pressure contact with one side of a pressure piston 17 of a master cylinder device 18, the opposite side of said piston being in contact with hydraulic fluid in a brake cylinder conduit 19 for transferring to said hydraulic fluid a force exerted on said piston by said opposite end of said lever in a downwardly direction, as viewed in the drawing, and in a manner to be hereinafter explained.

The gravity braking force converter B further comprises a movable fulcrum member 20 axially displaceable in a substantially parallel relation to operating lever 14, said fulcrum member having a pair of rollers 21 disposed in one end thereof in an over-and-under fashion with the lower roller making rolling contact with the upper side of said operating lever opposite the side in contact with transfer piston 11 and master brake cylinder piston 17. The upper roller 21 is in rolling contact with a buffer plate 22 fixed in casing 10 in a spaced-apart parallel relation to operating lever 14, the spacing distance between the buffer plate and the operating lever being substantially equal to the total diameters of the two rollers to permit snug rolling motion thereof with a minimum of friction between the buffer plate and the operating lever during axial displacement of the fulcrum member. The axial position of fulcrum member 20 and therefore of the rollers 21 relative to operating lever 14 determines the fulcrum point of said lever and the respective lengths of the moment arms of the lever. Thus a gravitational force exerted by the vehicle on the transmission section A and applied by the transfer piston 11 to the adjacent end of operating lever 14 causes a brake-applying force to be exerted by the other end of said lever to master cylinder piston 17 at a ratio determined by the respective lengths of the moment arms of said lever.

The roller-supporting end of fulcrum member 20 is connected to one end of a piston rod 23 which is sealingly and slidably supported in a guide bore formed in a separating wall 24 formed internally of casing 10 for separating hydraulic chamber 13 from a pneumatic pressure control chamber 25 surrounding said piston rod. A drive piston 26 is carried by the other end of piston rod 23 which also has an internally formed recess 27 opening to the exterior of the piston rod by a radially disposed passageway 28 adjacent the piston end. Recess 27 is open at its opposite end to hydraulic chamber 13 via a radially disposed passageway 29 formed in piston rod 23. An axially disposed passageway 30 connects the opposite faces of drive piston 26, said passageway having two radially disposed openings 31 and 32 which open to the exterior of piston rod 23 adjacent said drive piston. Opening 32 is formed diametrally opposite passageway 28.

A tubular valve member 33 is coaxially slidably carried on the exterior of piston rod 23. One end of valve member 33 normally abuts against drive piston 26 and the opposite end is sealingly slidably guided in a separating wall 34 formed internally of casing 10 for separating pneumatic pressure control chamber 25 from a hydraulic pressure control chamber 35 surrounding the outer side of said valve member between said drive piston and separating wall 24. A spring 36 compressed between separating wall 24 and valve member 33 normally retains said valve member in abutting contact with drive piston 26 and, consequently, the fulcrum member 20 in a neutral position, in which it is shown in the drawing and in which the rollers 21 are positioned directly in axial alignment with transfer piston 11, so that in said neutral position the effects of gravitational force of the vehicle are not transmitted via lever 14 to master cylinder 18.

Valve member 33 has at the end adjacent drive piston 26 an internally formed annular groove 37 which is in registry with radial passageways 28 and 32 to place said passageways in communication with each other when said valve member is in abutting contact with drive piston 26. Thus, with valve member 33 in this abutting position, hydraulic fluid from hydraulic chamber 13 at atmospheric pressure is communicated via radial passageway 29, recess 27, radial passageway 28, annular groove 37, radial opening 32, and axial passageway 30 to a hydraulic pressure operating chamber 38 adjacent the face of drive piston 26 opposite hydraulic pressure control chamber 35. Also in the abutting position of valve member 33 relative to drive piston 26, radial opening 31 is lapped off from chamber 35.

The pneumatic-to-hydraulic pressure converter C comprises a hydraulic fluid chamber 39 which is in constant communication with hydraulic pressure control chamber 35 via a passageway 40, and which is connected to hydraulic chamber 13 via a passageway 41 with a one-way check valve 42 interposed therein to permit flow in a direction from chamber 13 to chamber 39 only. A floating piston 43 sealingly separates hydraulic fluid chamber 39 from a pneumatic pressure chamber 44. Floating piston 43 is normally biased by a spring 45 disposed in chamber 39 to a pressure-free or slack position. When pressure in chamber 44 is at atmospheric pressure, spring 45 is effective for moving piston 43 upwardly, as viewed in the drawing, during which movement hydraulic fluid is drawn from chamber 13 via passageway 41 past check valve 42 into chamber 39 so as to keep the variable volume of said chamber 39 constantly filled with a solid column of hydraulic fluid regardless of the position of floating piston 43.

The check valve device D comprises a hydraulic fluid delivery chamber 46, to which brake cylinder conduit 19 opens, and a hydraulic fluid supply chamber 47 constantly in communication with hydraulic fluid chamber 39 via a passageway 48. A check valve 49, which is interposed between supply chamber 47 and delivery chamber 46, is operable either to an unseated or open position, in which said supply and delivery chambers are in communication with each other, or to a closed or seated position on a valve seat 50 for cutting off said communication between said supply and delivery chambers.

Check valve 46 is urged in one direction toward its seated position by a spring 51 disposed in delivery chamber 46. A valve stem 52 extends axially from check valve 49 through supply chamber 47 to normally make abutting contact with an axially aligned, valve-operating piston 53. One side of valve-operating piston 53 adjacent hydraulic fluid supply chamber 47 is subject to the hydraulic pressure prevailing in said supply chamber while the opposite side of said piston is adjacent to and subject to hydraulic fluid at atmospheric pressure in a balancing chamber 54 open to hydraulic chamber 13 via a passageway 55. Valve-operating piston 53 is urged by a spring 56, disposed in balancing chamber 54, to a contact position relative to valve stem 53 in which valve 49 is operated to its open position, said valve-operating piston being operable by prevailing hydraulic pressure in supply chamber 47 sufficient for overcoming spring 56, to a detached position out of contact with valve stem 52 and in which valve 49 is operated to its closed position.

The pneumatic or air pressure drive section E comprises an auxiliary reservoir 57 which is chargeable with compressed air from a brake pipe 58 when said brake pipe is charged in well-known manner. The brake pipe 58 is connected to a passageway 59 which opens to a charging chamber 60 of the drive section E. Charging chamber 60 is separated from an equalizing chamber 61 by a diaphragm-valve member 62 having a centrally disposed aperture 63 for communicating the opposite sides of said diaphragm with each other.

Three check valve devices 64, 65, and 66 are operably disposed in charging chamber 60. Check valve device 64 is interposed in passage means comprising passageway segments 67 and 68 for controlling communication between auxiliary reservoir 57 and pneumatic pressure chamber 44 of the pneumatic-to-hydraulic pressure converter C and between said chamber and atmosphere. Check valve device 65 is interposed in passage means, comprising passageway segments 69, 70, and 71 for controlling communication between charging chamber 60 and pneumatic pressure chamber 25 of the gravity braking force converter B and between said pneumatic pressure chamber and atmosphere. The pneumatic pressure drive section E also comprises an emergency reservoir 72 connecting with a passageway 73. Check valve device 66 is interposed between passageway 73 and passageway segments 70, 71 for controlling communication between emergency reservoir 72 and pneumatic pressure chamber 25, via passageways 71 and 73, for controlling communication between said emergency reservoir and atmosphere via passageways 73, 71 and check valve device 65, and for controlling communication between charging chamber 60 and said emergency reservoir via check valve device 65 and passageways 70, 73.

The check valve devices 64, 65, and 66 have operating pistons 74, 75, and 76 for operating valve members 77, 78, and 79 to unseated or open positions, said valve members being biased by springs 80, 81, and 82 to seated or closed positions, respectively. Piston 79 of check valve device 66 is subject to pneumatic pressure in charging chamber 60 and operable responsively thereto in a left hand direction, as viewed in the drawing, for effecting unseating of valve member 79. A pin 83 limits leftward movement of piston 76 so as to prevent closing off the ends of passageways 70 and 71 communicating with each other through the piston chamber.

Each of the operating pistons 74 and 75 of check valve devices 64 and 75 are provided with axially disposed passageways 84 and 85 extending through their entire lengths for communicating the ends of said pistons adjacent the valve members 77 and 78 with atmospheric vent ports 86 and 87, respectively.

Check valve devices 64 and 65 are disposed parallel to each other so that an operating bar 88 may extend therebetween with the opposite ends of said bar engaging respective grooves formed in the pistons 74 and 75. Operating bar 88 carries a cylindrical spring housing 89 closed at the right hand end, as viewed in the drawing, and extending transversely from the mid-point of said bar at which said housing is fixed. A spring 90 enclosed within housing 89 and compressed between the closed end thereof and an internal wall of casing 10, serves to bias bar 88 and said housing in a right-hand direction so as to have said closed end normally in contact with diaphragm 40 at a point coinciding with aperture 63.

The rightward movement of bar 88 and therefore spring housing 89 is limited to an amount such that when said housing makes contact with diaphragm-valve member 62, said diaphragm-valve member is not extended by said rightward movement beyond a plane coinciding with the unstressed or relaxed position of the diaphragm-valve. Movement of bar 88 and therefore of operating pistons 74 and 75 in a left-hand direction, as will hereinafter be more fully described, is limited to an amount such that leftward movement of said pistons does not close off the openings of passageways 68 and 67 into the piston chambers of check valve devices 64 and 65, respectively.

In considering the operation of the apparatus embodying the invention, the following assumptions are made: (1) brake cylinder conduit 19 is filled with unpressurized hydraulic fluid so that the vehicle brakes are in a released condition; (2) chamber 39 below piston 43 is filled with hydraulic fluid; (3) a suitable quantity of hydraulic fluid, as indicated by the hydraulic fluid level gauge 15, is maintained in chamber 13 at atmospheric pressure; (4) the car weight is transmitted to torque rod 6 so that a gravitational force proportional to the car weight acts on transfer piston 11; and (5) all operating parts of the pneumatic pressure drive section E are in the respective positions shown in the drawing.

If in this state of the apparatus brake pipe 58 is charged with compressed air at a predetermined normal pressure such as 72 psi., for example, this compressed air also flows into charging chamber 60 to the left side of diaphragm 62. Since check valve 78 is seated, pneumatic pressure in chamber 60 initially builds up and becomes effective for moving diaphragm-valve member 62 to the right out of contact with spring housing 89 so that pneumatic pressure may flow through aperture 63 into auxiliary reservoir 57, whence it may flow into passageway 67. But since check valve 77 is also seated, pneumatic pressure in auxiliary reservoir 57 continues to build up until the pressure in said auxiliary reservoir and in brake pipe 58 equalizes, at which point diaphragm-valve member 62 reverts to an unstressed or relaxed position in contact with spring housing 89.

The right-hand side of piston 76 of check valve device 62 is subjected to brake pipe pressure in charging chamber 60. Since the left-hand side of piston 76 at this time is open to atmosphere via passageway 70 and axial passageway 85 through piston 75 of check valve device 65, piston 76 is moved to the left, opening check valve 79. If, at this time, there is any residual pressure in emergency reservoir 72, such residual pressure is discharged to atmosphere, together with that in pneumatic pressue chamber 25 of section B, via passageways 73, 71, and 70, and thence through check valve device 65, as above described. Because of pin 83, piston 76, as above noted, is limited in its movement to the left.

Because, at this time, the left side of piston 74 of check valve device 64 is also open to atmosphere past the unseated valve seat on its left and, through axial passageway 84 and through atmospheric port 86, chamber 44 of section C is also at atmospheric pressure. With chamber 44 at atmospheric pressure, spring 45 is effective for moving piston 43 to its uppermost limit, during which movement hydraulic fluid is drawn from hydraulic chamber 13 through check valve 42.

The drive piston 26 of the gravity braking force converter B is normally biased in a left-hand direction to a neutral position by the force of spring 36 acting through valve member 33. Since, in this neutral position of drive piston 26, the position of rollers 21, and therefore the fulcrum point of lever 14, coincides with the vertical axis of transfer piston 11, all of the gravitational force acting on said piston is transmitted to the buffer plate 22. None of the gravitational force, therefore, is transmitted through lever 14 to the master brake cylinder device 18. Since spring 56 of hydraulic pressure check valve section D at this time, acting through piston 53 and valve stem 52, is holding check valve 49 in its open position, in which chamber 39 (now at atmospheric pressure) is in communication with master cylinder 18, the hydraulic fluid in said master brake cylinder is also at atmospheric pressure.

A reduction of pressure in brake pipe 58, which, as previously noted, had been charged to a pressure of 72 psi., may be effected to a degree sufficient for obtaining the desired braking effect. If an initial, or what may be called a minreduction, of 6 psi., for example, is initiated, such reduction also takes effect in charging chamber 60 so that a pressure differential is established between the opposite sides of diaphragm-valve member 62. Due to the relatively large pressure areas on the respective opposite sides of diaphragm-valve 62, even the initial effect of such a small pressure reduction and the resulting small pressure differential therefrom is sufficient for causing said diaphragm-valve, and therefore the aperture 63 therein, to be pressed against spring housing 89 to insure closure of said aperture and prevention of backflow therethrough. When the reduction of 6 psi. reaches its full effect, the resulting pressure differential between the opposite sides of diaphragm-valve 62 is sufficient to cause further leftward movement of said diaphragm-valve and compression of spring 90 in spring housing 89, which is thereby moved to the left along with lever 88. Pistons 74 and 75 of valve devices 64 and 65 are also moved to the left until contact is made with check valves 77 and 78 to first close axial passageways 84 and 85 and then open said check valves, respectively. Chamber 44 of pneumatic-to-hydraulic converter C is thus communicated with auxiliary reservoir 57 via passageways 67 and 68, and brake pipe 58 is communicated with pneumatic pressure chamber 25 of gravitational braking force converter B via passageway 59, charging chamber 60, passageway 69, unseated check valve 78, and passageways 70 and 71.

The increased pneumatic pressure in chamber 44 of pneumatic-to-hydraulic pressure converter C acts on piston 43 to exert a corresponding pressure on hydraulic fluid in chamber 39 thereby effectively seating ball check valve 42. With check valve 42 seated, the pressure of hydraulic fluid in chamber 39 is communicated via passageway 52, supply chamber 47, unseated check valve 49, and conduit 19 to the hydraulic fluid in master brake cylinder 18, which tends to exert an upward force on piston 17 and the adjacent end of lever 14. Since upward movement of piston 17 and the adjacent end of lever 14 is resisted by the spring-biased pressure device 16, the pressure acting on hydraulic fluid in conduit 19 is transmitted via said conduit to the brake cylinder (not shown) for moving the brake shoes (not shown) toward the wheel (not shown) for for closing the gap between the shoes and the wheel.

Pressurized hydraulic fluid in supply chamber 47 of section D also acts on the adjacent side of piston 53, and is sufficient for overcoming the opposing force of spring 56 to cause said piston to be moved to the left out of contact with valve stem 52. Since, at this stage, hydraulic pressure is the same on both sides of check valve 49, spring 51 is effective for seating said check valve on valve seat 50. Moreover, the hydraulic pressure acting in brake cylinder conduit 19 is sufficient for maintaining the brake shoes (not shown) against the wheel (not shown). When piston 17 of master brake cylinder 18 exerts further pressure on the hydraulic fluid in conduit 19, as will hereinafter be explained, seated check valve 49 prevents backflow of such increased pressure therepast.

Hydraulic pressure acting in chamber 39 is also transmitted via passageway 40 to hydraulic pressure control chamber 35 of section B, thereby tending to move valve member 33 to the right. But since, at this point, pneumatic pressure from brake pipe 58 also prevails in pneumatic pressure chamber 25 (as above described when check valve 78 is open), such pneumatic pressure along with the force of spring 36 balance the effect of hydraulic pressure in chamber 35 to maintain said valve member and therefore drive piston 26 in their respective neutral positions. Spring 36 is of predetermined compression rating so as to provide the desired results with respect to movement of valve member 33.

The action of the apparatus, as described up to this point, is effected when a min-reduction of 6 psi. of brake pipe pressue is made. This action results in bringing the brake shoes up against the wheel only, and does not produce sufficient force for effective braking effort.

Notwithstanding further reduction of brake pipe pressure, the action of the pneumatic pressure drive section E is limited to that above described. This is so, because the capacity of auxiliary reservoir 57 and the pressure area of piston 43 adjacent pneumatic chamber 44 are fixed. Thus, with check valve 77 open, the respective pressure in auxiliary reservoir 57 and in chamber 44 equalize, and, therefore, the maximum pressure that piston 43 can exert on the column of hydraulic fluid in chamber 39 is determined by the maximum pneumatic pressure at which said auxiliary reservoir and said pneumatic chamber equalize, which, at the most, may be on the order of 66 psi.

In order to produce an effective brake application subsequently to movement of the brake shoes into contact with the wheel, as above described, a further reduction, or what may be called a service reduction, of pressure in brake pipe 58 is effected to a preselected degree in excess of the min-reduction of 6 psi. As will be explained in detail, the degree of service reduction determines the position of fulcrum member 20 relative to operating lever 14 in the gravitational braking force ratio converter B, thereby establishing the degree of braking force applied by the shoes to the wheel.

When a further reduction of brake pipe pressure in excess of 6 psi. is effected, such reduction also occurs in pneumatic pressure chamber 25 on the adjacent side of valve member 33 of section B, whereupon hydraulic pressure in hydraulic chamber 35 on the opposite side of said valve member is effective for moving the valve member to the right against the opposing force of spring 36 and the residual pneumatic pressure in chamber 25. The amount of rightward movement of valve member 33, of course, is determined by the degree of pressure differential established between the hydraulic pressure side and the pneumatic pressure side, as affected by the effects of spring 36. Spring 36 is calibrated such that the valve member 33 is permitted to move to the right to an extent that permits radial opening 31 only on piston rod 23 to be temporarily uncovered, whereby pressurized hydraulic fluid (at 66 psi.) may flow via axial passageway 30 into chamber 38 on the left side of drive piston 26. (If valve member 33 moved sufficiently to the right to uncover opening 32 also, it will be noted that such an amount of movement would also uncover diametrally oppositely disposed opening 28 in piston rod 23. Uncovering of opening 28 would allow pressurized hydraulic fluid in chamber 35 and consequently in chamber 38 to escape via said opening, recess 27, and opening 29 into atmospheric hydraulic chamber 13 and thereby become depressurized and ineffective for moving and retaining drive piston 26 to a rightward position.)

The hydraulic pressure differential between the two sides of drive piston 26 is made possible by the fact that the pressure area on the right side of siad drive piston is smaller than the pressure area on the left side thereof by an amount equal to the cross-sectional area of piston rod 23. Drive piston 26 thus moves the entire fulcrum member 20 to the right to an operative position but only to the extent that opening 31 is closed and opening 32 is held short of registering with annular groove 35 in said valve member. With both openings 31 and 32 lapped off by valve member 33, further flow of pressurized hydraulic fluid into chamber 38 is cut off, and at the same time escape of pressurized hydraulic fluid from chamber 38 into recess 27 and atmospheric hydraulic chamber 13 is prevented. At this point all opposing forces acting on drive piston 26 and valve member 33 are balanced, and the operative position of fulcrum member 20 is established. The position thus assumed by fulcrum member 20 determines the position of rollers 21 on lever 14 and, therefore, the fulcrum point thereof.

With the fulcrum point of lever 14 thus established, the gravitational force transmitted through ransfer piston 11 acts on the adjacent end of said lever to set up a clockwise moment, as viewed in the drawing, about the fulcrum point, whereby the opposite end of said lever bears downwardly on piston 17 of master brake cylinder 18 for transferring a force therethrough onto hydraulic fluid in brake cylinder conduit 19 proportional to said gravitational force at a ratio determined by the location of the fulcrum rollers 21 and the relative lengths of the moment arms thus established. The degree of force thus exerted by piston 17 on the hydraulic fluid in conduit 19 determines the degree of effective braking pressure exerted by the brake shoes on the wheel.

It should also be noted at this point that the increased pressure on the hydraulic fluid in conduit 19 causes check valve 49 to firmly seat on valve seat 50 and thereby prevent backflow of highly pressurized hydraulic fluid to chamber 39 of the pneumatic-to-hydraulic pressure converter C.

If it is desired to increase the braking effort, a further reduction of pressure in brake pipe 58 is effected which, in the manner above described, causes the fulcrum member 20 and therefore the fulcrum of lever 14 to be moved further to the right and thus proportionally increase the degree of gravitational force transferred to the master brake cylinder 18. Since the compression rate of spring 36 is constant, the fulcrum member 20 is moved to the right for a limited increment each time a brake pipe pressure reduction is made. The braking force, or the ratio of gravitational force to the force delivered by master brake cylinder 18, increases each time the fulcrum member 20 moves rightwardly to a new position. Thus, when fulcrum rollers 21 are centered on lever 14 midway between the two ends thereof, the gravitational force at the end of lever 14 adjacent transfer piston 11 is equal to the force delivered by the opposite end of said lever to master brake cylinder 18.

Although, as above set forth, the degree of braking force is indirectly affected by the degree of brake pipe pressure reduction in that the position of fulcrum member 20 relative to lever 14 is established when a brake pipe pressure reduction is made, it should be apparent that, unlike conventional air brake apparatus, the degree of braking applied at the vehicle wheel is not proportional to the degree of brake pipe pressure reduction, but rather is proportional to the degree of gravitational force transmitted to the master brake cylinder device 18 at a ratio established by the position of the fulcrum member 20. In accordance to the object of the invention, therefore, any vertical oscillations of the wheel due to the condition of the running surface causes corresponding variations in the deflection of load spring 4 and, therefore, in the gravitational forces transmitted through the transmission section A. Such variations of gravitational force are reflected in the transmittal thereof, through the gravitational braking force ratio converter section B, to the master brake cylinder 18. Thus, the force acting on piston 17 of master brake cylinder 18 is constantly changing or being adjusted to correspond to the variations of the gravitational force prevailing from instant to instant, thereby varying the braking force acting on the wheel accordingly. Excessive braking and consequent wheel-sliding is thus prevented.

In order to release the brakes, either partially or completely, pressure in brake pipe 58 is increased accordingly, such increase also occurring in charging chamber 60 of section E and pneumatic pressure chamber 25 of section B. The increased pneumatic pressure in chamber 25, acting with spring 36, is effective for moving valve member 33 to the left until opening 32 in piston rod 23 registers with annular groove 37 in said valve member thereby releasing hydraulic fluid in chamber 38 to atmospheric hydraulic chamber 13 via passageway 30, opening 32, annular groove 37, radial opening 28, recess 27, and opening 29. Hydraulic fluid on the right side of drive piston 26 being at the pressure prevailing in chamber 39 forces said drive piston to the left to a position at which valve member 33 again laps off the openings 31 and 32. Accordingly, fulcrum member 20 is moved leftwardly a corresponding amount, thus reducing the force acting on master brake cylinder 18 and consequently the braking force at the vehicle wheel.

Although, in this manner, pressure in brake pipe 58 may continue to be increased until fulcrum member 20 resumes its neutral position in which the vehicle brakes, for all practical purposes, are completely released, the brake shoes are not withdrawn away from the wheel until brake pipe pressure is restored to a value of approximately 65 psi., for example. With brake pipe pressure at 65 psi., the pressure differential between the opposite sides diaphragm-valve 62 is dissipated, and spring 90 is effective for returning lever 88, along with pistons 74 and 75, to respective normal positions in which check valves 77 and 78, respectively, are reseated or closed. With check valves 77 and 78 reseated and pistons 74 and 75 in their normal positions, pneumatic pressure in chamber 44 is released to atmosphere via passageways 68 and 84, and atmospheric port 86, and pneumatic pressure in chamber 25 is released via passageways 71, 70, and 85, and atmospheric port 87.

Subsequent to this action, the pressure on hydraulic fluid in chamber 39, and therefore in supply chamber 47 of section D, is released so that spring 56 moves piston 53 into contact with valve stem 52, which results in unseating or opening of check valve 49. With check valve 49 unseated, hydraulic fluid in conduit 19 is depressurized and forced back to chamber 39 of section C by action of the return spring (not shown) in the brake cylinder (not shown), thus withdrawing the brake shoes completely away from the wheel.

As drive piston 26 and valve member 33 move to their respective neutral positions, hydraulic fluid in chamber 38 flows through passageway 30, opening 32, annular groove 37, opening 28, recess 27, and opening 29 into hydraulic fluid storage chamber 13.

With chamber 49 at atmospheric pressure, spring 46 moves piston 43 to its uppermost limit and thereby causes hydraulic fluid to be drawn through check valve 42 from chamber 13 into chamber 39 for maintaining a solid column of fluid therein.

Actually check valve device 66 and emergency reservoir 72 are not considered essential to the present invention, and, therefore, it suffices to say that the purpose of said emergency reservoir is to provide a volume to which brake pipe pressure may be diverted for accelerating brake pipe pressure reduction during the initial phase of braking action. As above noted, when a brake pipe pressure reduction is effected, check valve 78 is unseated to connect chamber 25 of section B to brake pipe 58. And since check valve 79 is held unseated by brake pipe pressure acting on piston 76, reservoir 72 is thus connected with chamber 25 via unseated check valve 79 and passageways 71 and 73. The capacity of emergency reservoir 72 is selected to provide a maximum pressure reduction in relation to the capacity of brake pipe 58. Thus, when reservoir 72 is connected to brake pipe 58, as above set forth, the rate of reduction of brake pipe pressure is increased rapidly to the maximum permitted during a minimum reduction. This also accelerates reduction throughout the entire train. Spring 82 acting on check valve 79 is calibrated so as to reseat said check valve and prevent backflow from reservoir 72 following a brake pipe pressure reduction and flow of such pressure into said reservoir, when the pressure in brake pipe 58 and in said reservoir equalize at approximately 66 psi., for example. When pressure in brake pipe 58 is restored to a normal full charge, as above noted, of 72 psi., piston 75 acts to unseat check valve 79.

Having now described the invention, what we claim as new and desire to secure by Letters Patent, is:

1. Brake control apparatus for use on a vehicle having spring support means interposed between a sprung portion and an unsprung portion of the vehicle, said brake control apparatus comprising:
   a. first means including a fluid medium for exerting braking force on the vehicle in accordance with the pressure applied to the fluid medium;
   b. fulcrumed lever means having one end engaging said first means for applying pressure to said fluid medium according to a moment established about the fulcrum of said lever means;
   c. second means for transmitting gravitational force of the vehicle to the other end of said lever means;
   d. fulcrum means including a fulcrum member positionally adjustable relative to the longitudinal axis of said lever means for determining the fulcrum point dividing said lever means into moment arms and consequently establishing the degree of pressure applied by said one end of said lever means on the fluid medium relative to the gravitational force acting on said other end of said lever means at a ratio determined by said moment arms; and
   e. operator control means selectively operable for actuating said fulcrum means and setting the position of said fulcrum member relative to said lever means.

2. Vehicle brake control apparatus, as set forth in claim 1, wherein said second means comprises linkage means operably interposed between the sprung and unsprung portions of the vehicle, said linkage means being operably responsive to deflections of the spring support means for transmitting said gravitational force to said other end of said lever means at a degree corresponding to the amount of deflection of the spring support means at any given instant.

3. Vehicle brake control apparatus, as set forth in claim 2 wherein said linkage means comprises:
   a. a torque rod axially rotatably supported on the sprung portion of the vehicle;
   b. a pair of torque arms axially spaced on said torque rod in perpendicular relation thereto and each having one end fixed to said torque rod for rotation therewith; and
   c. a connecting rod for connecting the end opposite said one end of one of said torque arms to the unsprung portion,
   d. the other of said torque arms having the end opposite its said one end in operable engagement with said other end of said fulcrumed lever means for exerting said gravitational force thereon.

4. Brake control apparatus, as set forth in claim 1, wherein said first means comprises a master cylinder device including a pressure piston engaged by said one end of said fulcrumed lever means for applying said pressure on said fluid medium through said pressure piston.

5. Brake control apparatus, as set forth in claim 1, wherein said fulcrum member normally occupies a neutral position in which said fulcrum point coincides with said other end of said fulcrumed lever means so as to transmit no pressure at said one end of said lever means, said fulcrum member being operable responsively to fluid pressure out of said neutral position to a plurality of operative positions in which said fulcrum point is established according to the degree of fluid pressure differential established by said operator control means and acting on the fulcrum member.

6. Brake control apparatus, as set forth in claim 5, further characterized by biasing means for retaining said one end of said fulcrumed lever means in contacting engagement with said first means at all times.

7. Brake control apparatus, as set forth in claim 5, wherein said fulcrum means includes a drive piston for operating said fulcrum member, said drive piston being subjected on one side to a constant fluid pressure and on the opposite side to a variable fluid pressure, said constant fluid pressure acting on said one side of said drive piston being effective upon selective variation of said variable fluid pressure by said operator control means for establishing a fluid pressure differential across said drive piston to effect operation of said fulcrum member to one of its said plurality of operative positions according to the degree of said fluid pressure differential.

8. Brake control apparatus, as set forth in claim 7, wherein said constant fluid pressure acting on said one side of said drive piston is hydraulic fluid pressure and said variable fluid pressure acting on the opposite side of said drive piston is pneumatic fluid pressure.

9. Brake control apparatus, as set forth in claim 8, further characterized by pneumatic-to-hydraulic pressure converter means including a floating piston having one side thereof in pressure contact with hydraulic fluid acting on said one side of said drive piston and the other side subject to a constant pneumatic pressure established by the operator control means.

10. Brake control apparatus, as set forth in claim 9, wherein said operator control means further comprises:
   a. a brake pipe normally charged to a preselected pneumatic pressure;
   b. a fixed volume chargeable with pneumatic pressure from said brake pipe;
   c. diaphragm-valve means interposed between said brake pipe and said fixed volume and effective upon equalization of pneumatic pressure on opposite sides thereof for automatically isolating said brake pipe from said fixed volume upon equalization of pneumatic pressure therebetween at said preselected pneumatic pressure;
   d. a first check valve device interposed in first passage means for controlling communication between said brake pipe and said opposite side of said drive piston and effective, when in an open position, for establishing pneumatic brake pipe pressure on said opposite side of said drive piston via said first passage means; and
   e. a second check valve device interposed in second passage means for controlling communication between said fixed volume and said opposite side of said floating piston and effective, when in an open position, for establishing pneumatic pressure on said opposite side of the floating piston via said second passage means at a degree equivalent to that in the fixed volume and consequently on said one side of said drive piston through the hydraulic fluid, f. said first and second check valve devices being operable simultaneously to their respective open positions by said diaphragm-valve means upon reduction of brake pipe pressure acting on one side thereof to a pressure less than a certain degree.

11. Brake control apparatus, as set forth in claim 10, further characterized by first biasing means effective for simultaneously operating said first and second check valve devices to respective closed positions, in which said communications are cut off and said first and second passage means are opened to atmosphere, upon restoration of brake pipe pressure acting on said one side of the diaphragm-valve means to a pressure exceeding said certain degree.

12. Brake control apparatus, as set forth in claim 10, wherein the degree of pneumatic pressure acting on said opposite side of said drive piston is variable according to the prevailing degree of brake pipe pressure during such time that said first check valve device is in its said open position.

13. Brake control apparatus, as set forth in claim 11, further characterized by second biasing means for restoring said fulcrum member to its said neutral position upon operation of said first and second check valve devices to their respective closed positions.

* * * * *